United States Patent [19]

Kaplan et al.

[11] Patent Number: 5,302,293
[45] Date of Patent: Apr. 12, 1994

[54] METHOD OF CONTROLLING IRON IN PRODUCED OILFIELD WATERS

[75] Inventors: Roy I. Kaplan, Missouri City; John D. Johnson, Sugar Land, both of Tex.

[73] Assignee: Nalco Chemical Company, Naperville, Ill.

[21] Appl. No.: 912,871

[22] Filed: Jul. 13, 1992

[51] Int. Cl.$^5$ ............................................. C02F 5/12
[52] U.S. Cl. ................................... 210/701; 210/698
[58] Field of Search ............... 210/701, 698, 699, 700; 252/180, 181

[56] References Cited

U.S. PATENT DOCUMENTS

| | | | |
|---|---|---|---|
| 3,170,883 | 2/1965 | Owen et al. | 252/187 |
| 3,285,886 | 11/1966 | Gunderson | 260/80.3 |
| 3,709,815 | 1/1973 | Boothe et al. | 210/58 |
| 3,709,816 | 1/1973 | Walker et al. | 210/58 |
| 3,806,367 | 4/1974 | Lange et al. | 134/3 |
| 3,928,196 | 12/1975 | Persinski | 210/58 |
| 4,062,796 | 12/1977 | Gardner et al. | 210/698 |
| 4,401,587 | 8/1983 | Boffardi | 252/389 |
| 4,434,059 | 2/1984 | Johnson et al. | 210/701 |
| 4,446,028 | 5/1984 | Becker | 210/697 |
| 4,451,376 | 5/1984 | Sharp | 210/701 |
| 4,532,048 | 7/1985 | Amjad et al. | 210/701 |
| 4,536,292 | 8/1985 | Matz | 210/701 |
| 4,584,105 | 4/1986 | Fong | 210/701 |
| 4,604,431 | 8/1986 | Fong et al. | 525/351 |
| 4,640,793 | 2/1987 | Persinski | 252/82 |
| 4,642,194 | 2/1987 | Johnson | 210/699 |
| 4,703,092 | 10/1987 | Fong | 525/351 |
| 4,707,271 | 11/1987 | Amjad et al. | 210/701 |
| 4,711,725 | 12/1987 | Amick et al. | 210/701 |
| 4,752,443 | 6/1988 | Hoots et al. | 422/13 |
| 4,801,388 | 1/1989 | Fong et al. | 210/701 |
| 4,869,828 | 9/1989 | Hoots et al. | 210/701 |
| 4,929,425 | 5/1990 | Hoots et al. | 422/13 |

*Primary Examiner*—Neil McCarthy
*Attorney, Agent, or Firm*—Robert A. Miller; Joseph B. Barrett; James J. Drake

[57] ABSTRACT

The present invention provides a process for stabilizing iron oxides and iron hydroxides in produced oil field waters. A water soluble polymer containing pendant N-substituted amide functionality units is added at a rate of about 6 parts by weight polymer to 10 parts by weight iron in the produced water.

7 Claims, No Drawings

METHOD OF CONTROLLING IRON IN PRODUCED OILFIELD WATERS

BACKGROUND OF THE INVENTION

The present invention relates to processes for controlling the deposition of iron oxides from produced oil field waters. More particularly, the present invention relates to the use of water soluble polymeric compounds to keep iron oxide particles in produced water suspended.

Oil field produced water is generally saline and often contains significant amounts of dissolved solids, suspended debris from corrosion or the oil-bearing formation, and soluble metals such as iron. Commonly employed control chemicals such as phosphonates, phosphate esters, and a variety of low molecular weight vinyl polymers can help present massive deposition due to the scales such as calcium carbonate, calcium phosphate and calcium sulfate. The dispersing capability of some polymers can keep small particulate matter from settling in lines, tanks and other flow areas. Iron, which normally enters the produced water systems as the soluble $Fe^{2+}$ species, can precipitate as the iron (hydr)oxide (a mixture of iron oxides and iron hydroxides). This precipitation, if allowed to go unchecked, can result in flow restriction or line blockage. Ultimately, concentration cells can develop under these deposits and generalized or pitting corrosive attack occurs.

Various systems have been developed in other scientific fields to control or stabilize iron (hydr)oxide in aqueous systems. Such a system is disclosed in U.S. Pat. No. 4,869,828 assigned to Nalco Chemical Company. That system involves treating the aqueous system with from 1.0 to 50 ppm of a water soluble polymer having a molecular weight of from 5,000 to 100,000. The polymer contains from 5 to 85 mole percent pendant N-substituted amide functionality units and from 15 to 95 mole percent of acrylic acid units or a mixture of acrylic acid and (meth)acrylamide units. The N-substituted amide functionality includes amide substituted with sulfoalkyl.

As iron precipitates, it is believed that most of such precipitate is composed of ferric oxide and ferric hydroxide, wherein the iron is in its oxidation state of three, referred to as "iron (III)". For purposes of the present invention, the relative proportions of the precipitate between ferric oxide and ferric hydroxide is not important nor does it matter whether some, or even all, of the iron precipitate is ferrous oxide or ferrous hydroxide. Hence, the iron precipitate which is generally a mixture of ferric oxide and ferric hydroxide, possibly with some ferrous species therein, will be referred to hereinafter as iron (hydr)oxide. It is also to be understood that the term iron (hydr)oxide includes any and all hydrated forms of such oxides and hydroxides.

As petroleum products are produced from fields having high concentrations of iron in the produced water, it is important that a suitable process be developed for controlling deposition of iron precipitates. Additionally, if these fields are located in arctic areas, it would be important to develop a process in which the additive could withstand low temperatures. Such a process is disclosed and claimed herein.

SUMMARY OF THE INVENTION

The present invention provides a process for the stabilization of iron (hydr)oxides, deposits or precipitates in produced oil field water piping. The process involves the addition to the produced oil field waters of a water soluble sulfonated polyacrylate at a rate greater than about 6 parts by weight polymer to 10 parts by weight iron in the produced water.

In a preferred embodiment, the sulfonated polyacrylate comprises a polymer containing pendant N-substituted amide functionality having the chemical formula of Formula I:

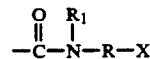

Formula I wherein $R_1$ is hydrogen or alkyl, R is alkylene having 1 to 3 carbon atoms or phenylene, X is sulfonate, and the alkylene and phenylene may be further substituted with hydroxy.

In preferred embodiment the pendant N-substituted amide functionality is within polymer units having the chemical formula of Formula II:

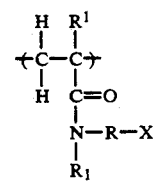

Formula II

Wherein R' is hydrogen or methyl and R, $R_1$, and X are as defined above for Formula I.

In one preferred embodiment, such N-substituted amide-containing polymer is a polymer substantially derived from ethylenically unsaturated amide-containing and carboxylate-containing monomers, subjected to post-polymerization derivatization wherein some or all of the amide functionality is converted to N-substituted amide functionality according to Formulas I or II above.

These and other preferred embodiments of the present invention are described in more detail below.

PREFERRED EMBODIMENTS OF THE INVENTION

The polymer employed in the present invention may be one containing units of sulfomethyl acrylamide, sulfomethyl methacrylamide, sulfoethyl acrylamide, sulfoethyl methacrylamide, sulfopropyl acrylamide, sulfopropyl methacrylamide, hydroxysulfoethyl acrylamide, hydroxysulfoethyl methacrylamide, hydroxysulfopropyl acrylamide, particularly 2-hydroxy-3-sulfopropyl acrylamide, hydroxysulfopropyl methacrylamide, sulfophenyl acrylamide, sulfophenyl methacrylamide, hydroxysulfophenyl acrylamide, and hydroxysulfophenyl methacrylamide, it being understood that where the unit as designated includes isomers, such as the designation hydroxysulfophenyl acrylamide, all reasonable isomers thereof are included.

The polymer employed in the present invention contains units derived from acrylic acid and methacrylic acid as the carboxylate containing monomers, although such carboxylate functionality may be derived from other carboxylate containing monomers such as maleic anhydride or acid, itaconic acid, and the like. It has been demonstrated that the process of the present invention is extremely effective using polymers wherein the carboxylate functionality is derived from acrylic acid, but the use of other carboxylate-containing ethylenically unsaturated monomers is believed to provide a similarly active polymer. The term carboxylate as used herein includes the acid form and its alkali metal and ammonium salts.

The polymer employed in the present invention may be substantially a copolymer of N-substituted amide units and carboxylate-containing units, or in another embodiment it may be substantially a terpolymer that further contains unsubstituted amide units. In such latter instance, the unsubstituted amide units are preferably derived from the monomers acrylamide and methacrylamide.

The polymer employed in the present invention may contain mixtures of the above described N-substituted amide units or carboxylate-containing units, or unsubstituted amide units, or the polymer employed may be a mixture of polymers varying as to their N-substituted amide units or carboxylate-containing units, or unsubstituted amide units, and varying as to their molecular weights.

In the preferred embodiment, the polymer employed in the present invention has a mole ratio of 5 to 85 moles of the N-substituted amide functionality-containing units to 15 to 95 moles of other units. In a further preferred embodiment, such polymer has a molecular weight of from about 5,000 to 100,000. In another preferred embodiment, the polymer employed in the present invention is substantially a copolymer having a mole ratio of 5 to 75 moles of the N-substituted amide functionality-containing units to 25 to 95 moles of carboxylate-containing units.

In another preferred embodiment, the polymer employed in the present invention is substantially a terpolymer having a mole ratio of from about 5 to about 85 moles of the N-substituted amide functionality-containing units, to from about 10 to about 90 moles of carboxylate-containing units, and from about 5 to about 85 moles of unsubstituted amide-containing units. In a further preferred embodiment, such terpolymers have a molecular weight of from about 5,000 to 100,000. In a more preferred embodiment, the polymer is substantially a terpolymer having a mole ratio of units of from about 5 to about 70 moles of the N-substituted amide-containing units, to from about 20 to about 85 moles of the carboxylate-containing units, to from about 5 to about 60 moles of the unsubstituted amide-containing units.

In still another preferred embodiment, the polymer is substantially a copolymer having a mole ration of units of from about 5 to about 50 moles of the N-substituted amide-containing units, to from about 50 to about 95 moles of the carboxylate-containing units.

In another preferred embodiment, the polymer is a copolymer or terpolymer having a mole ratio of units of from about 5 to about 50 moles of the N-substituted amide-containing units, to from about 40 to about 85 moles of the carboxylate-containing units, to from 0 to about 50 moles of the unsubstituted amide-containing units. In a further preferred embodiment, the polymer is substantially a terpolymer having a mole ratio of units of from about 5 to about 50 moles of the N-substituted amide-containing units, to from about 40 to about 85 moles of the carboxylate-containing units, to from about 10 to about 50 moles of the unsubstituted amide-containing units wherein the polymer has a molecular weight from about 5,000 to about 50,000.

In further preferred embodiments, the polymer employed in the present invention is an acrylic acid/sulfomethyl (meth)-acrylamide copolymer; acrylic acid/sulfoethyl (meth)acrylamide copolymer; acrylic acid/sulfopropyl (meth)acrylamide copolymer; acrylic acid/(meth)acrylamide/sulfomethyl(meth)acrylamide terpolymer; acrylic acid/(meth)acrylamide/sulfoethyl (meth)acrylamide terpolymer; acrylic acid/(meth)acrylamide/sulfopropyl (meth)acrylamide terpolymer; acrylic acid/(meth)acrylamide/2-hydroxy-3-sulfopropyl (meth)acrylamide terpolymer; or acrylic acid/(meth)acrylamide/sulfophenyl (meth)acrylamide terpolymer.

In other preferred embodiments, the polymers employed in the present invention are terpolymers of acrylic acid and (meth)acrylamide with either sulfomethyl (meth)acrylamide or sulfoethyl (meth)acrylamide, having mole ratios of from 40 to 85 moles of acrylic acid, to from 10 to 50 moles of (meth)acrylamide, to from 5 to 40 moles of sulfomethyl (meth)acrylamide or sulfoethyl (meth)acrylamide, and preferably such terpolymers have a molecular weight of from about 10,000 to about 40,000.

The polymeric compositions used in the present may be prepared by the molecular modification of a preexisting polymer chain of suitable length so as to incorporate a sulfonate substituent, as distinguished from attempts to build up a sufficiently large polymer from sulfonated monomers. One post-modification procedure is the reaction of an amide-containing polymer, such as an acrylamide- or methacrylamide-containing polymer, and a selected aminosulfonic acid. This reaction is believed to proceed by a transamidation mechanism. Such aminosulfonic acids include aminomethanesulfonic acid, 1-amino-2-hydroxy-3-propanesulfonic acid, 2-aminoethanesulfonic acid (taurine), 4-aminobenzenesulfonic acid (p-sulfanilic acid), and 3-aminobenzenesulfonic acid (metanilic acid). In addition, the alkali metal salts of these acids may be used in the preparation of the polymers used in the present invention. The selected aminosulfonic acid is advantageously added to a water solution of sodium hydroxide and the amide-containing polymer reactant, and the resultant mixture is then heated in a pressure reactor to a suitable temperature, such as 150° C., for a suitable length of time, such as 4 to 5 hours, after which the mixture is cooled and then either concentrated or dewatered to recover the adduct. Sulfomethylamide polymers can also be prepared by reacting a polyamide, such as an acrylamide-containing polymer, with formaldehyde-bisulfite or with aminomethane sulfonic acid at a suitable temperature, such as 150° C., for a suitable length of time, such as 4–5 hours.

EXAMPLE 1

Polymer Preparation

A mixture of poly(acrylamide (50 mole %]-acrylic acid) (150 g 31.5% solution in water., Mw 55,700); taurine (16.7 g); and sodium hydroxide (10.6 g 50% solution in water) was heated in a mini Parr pressure reactor at 150° C. for four hours. The reaction mixture was then cooled to room temperature. The molecular weight of the resulting polymer, determined by GPC using polystyrene sulfonate standard, was 56,000. The composition of the polymer was determined both by C-13 NMR and colloid titration and was found to contain about 50% carboxylate, 31% primary amide, and 19% sulfoethylamide.

EXAMPLE 2

Polymer Preparation

A mixture of poly(acrylamide (75 mole %]-acrylic acid) (150 g of 27.5% solution in water); sulfanilic acid (20.5 g); sodium hydroxide (9.3 g of 50% solution); and 10.5 g of water was heated in a mini Parr pressure reactor at 150° C. for five hours. The reaction mixture was thereafter cooled to room temperature. The molecular weight of the resulting polymer was 11,500 as determined by GPC using polystyrene sulfonate standard. The polymer contained about 5% sulfophenylamide, 47.5% primary amide, and 47.5% carboxylate as estimated by C-13 NMR.

EXAMPLE 3

Polymer Preparation

A mixture of poly(acrylamide [75 mole %) -acrylic acid) (150 g of 27.5% solution in water); aminomethane sulfonic acid (13.2 g); and sodium hydroxide (10.2 g of 50% solution) was heated in a mini Parr pressure reactor at 125° C. for four-and-a-half hours. The reaction mixture was thereafter cooled to room temperature. The molecular weight of the resulting polymer was 15,900 as determined by GPC using polystyrene sulfonate standard. The polymer contained about 45% acrylic acid, 40% acrylamide, and 15% sulfomethylacrylamide as estimated by C-13 NMR.

EXAMPLE 4

An iron stabilization solution was prepared by mixing 65 parts of the polymeric solution of Example 1 (38.4% solution of polymer in water) with 35 parts of ethylene glycol. The resulting 25% polymer solution was further diluted by adding 5 grams of the solution to a 1.00 liter volumetric flask and diluting to the mark with deionized water.

A stock solution of $Fe^{2+}$ was prepared by adding 9.9608 grams of reagent grade $FeSO_4.7H_2O$ to 100 ml of deionized water in a 1.000 liter volumetric flask. Additional water was added until the total volume was approximately 900 ml. A solution of 0.1N $H_2SO_4$ was added dropwise with shaking until the pH of the solution was lowered to 3.3±0.1. Finally, the iron stock solution was made up to the 1.000 liter mark with more deionized water.

A synthetic arctic brine solution was prepared by adding the following reagents to a 5 gallon carboy:

| | |
|---|---|
| 29.58 g. | Anhydrous $Na_2SO_4$ |
| 295.46 g. | NaCl |
| 5.35 g. | $CaCl_2.2H_2O$ |
| 65.72 g. | $MgCl_2.6H_2O$ |
| 4.40 g. | $NaHCO_3$ |

After addition of the salts, deionized water was added to the 16.0 liter mark. The pH of the synthetic brine was 7.88 and approximates degassed arctic brine.

The effectiveness of the polymer of the present invention in stabilizing iron in arctic brine solutions was then tested by adding the appropriate volume of iron stabilization solution as set forth in Table 1 to each of ten 4-ounce glass bottles. One milliliter of the iron stabilization solution equals about 12.5 ppm polymer.

Next, approximately 50 ml of synthetic produced arctic brine was added. Then, 2.5 ml of the $Fe^{2+}$ stock solution was pipetted into each bottle to give a final concentration of 50 ppm $Fe^{2+}$. Finally, the bottles were filled to a 100 ml mark with additional brine solution.

Each bottle was then capped, shaken, and placed in a 130° F. water bath for one hour. After removing the bottles from the bath, they were shaken and turbidity and pH values were determined. The contents of each bottle were then quickly filtered through 0.45μ Millipore filters to remove any precipitated iron. Total soluble iron was then determined on the filtrate using inductively coupled argon plasma.

The results of the tests are summarized in Table 1:

TABLE 1

STABILIZATION OF 50 PPM $Fe^{2+}$

| TEST NO. | PPM POLYMER | TURBIDITY, NTU | $Fe^{2+}$ IN FILTRATE, PPM | pH | % STABILIZED Fe |
|---|---|---|---|---|---|
| 1 | 0 | 97 | 12.9 | 4.63 | 25.8 |
| 2 | 12.5 | 51 | 13.6 | 4.88 | 27.2 |
| 3 | 25 | 30 | 15.0 | 5.36 | 30.0 |
| 4 | 31 | 6.9 | 34.6 | 5.27 | 69.2 |
| 5 | 37.5 | 3.3 | 36.4 | 5.30 | 72.8 |
| 6 | 44 | 3.0 | 35.9 | 5.44 | 71.8 |
| 7 | 50 | 1.9 | 36.7 | 5.30 | 73.4 |
| 8 | 56 | 1.3 | 37.2 | 5.27 | 74.4 |
| 9 | 62.5 | 0.7 | 37.7 | 5.31 | 75.4 |
| 10 | 69 | 0.8 | 36.9 | 5.37 | 73.8 |

As can be seen from the foregoing table, 50 ppm $Fe^{2+}$ can be effectively stabilized with about 30 ppm polymer. Higher concentrations of polymer did not appear to significantly affect the amount of iron stabilized. Accordingly, in one preferred embodiment, the polymer is added at a rate greater than 5 parts by weight polymer to 10 parts by weight iron in the produced water. In a more preferred embodiment, the polymer is added at a rate greater than about 6 parts by weight polymer to 10 parts by weight iron in the produced water.

As can be seen from the foregoing, the present invention provides an effective process for stabilizing iron (hydr)oxides in produced oil field waters. While the invention has been described with respect to the presently preferred embodiments, it will be apparent to those skilled in the art that modifications or changes can be made without departing from its spirit or essential characteristics. Accordingly, all modifications or changes which come within the meaning and range of equivalency of the claims are to be embraced within their scope.

What is claimed is:

1. A process for stabilizing iron (hydr)oxides in produced oilfield waters comprising:

adding to produced oilfield water a water soluble polymer having a molecular weight of from 5,000 to 100,000 which contains from 5 to 85 mole percent pendant N-substituted amide functionality units having the chemical formula

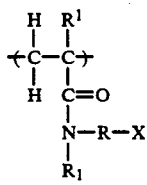

wherein R' is hydrogen or methyl, $R_1$ is hydrogen, R is alkylene having 1 to 3 carbon atoms or phenylene, X is sulfonate, and said alkylene may be further substituted with hydroxy, and 15 to 95 mole percent of acrylic acid units or a mixture of acrylic acid and (meth)acrylamide units, wherein said polymer is added to said produced water at a rate of about 6 parts by weight polymer to 10 parts by weight iron in said produced water.

2. A process for stabilizing iron (hydr)oxides as defined in claim 1 wherein said polymer is contained in a solution containing ethylene glycol.

3. A process for stabilizing iron (hydr)oxides as defined in claim 2 wherein said ethylene glycol concentration is 35 percent.

4. A process for stabilizing iron (hydr)oxides as defined in claim 1 wherein said polymer contains about 50 percent carboxylates, 31 percent primary amides, and about 19 percent sulfoethylamide as determined by C-13 NMR.

5. A process for stabilizing iron (hydr)oxides in produced oilfield waters comprising:

adding to produced oilfield water a water soluble polymer having a molecular weight of from 5,000 to 100,000 which contains from 5 to 85 mole percent pendant N-substituted amide functionality units having the chemical formula

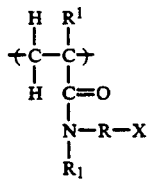

wherein R' is hydrogen or methyl, $R_1$ is hydrogen, R is alkylene having 1 to 3 carbon atoms or phenylene, X is sulfonate, and said alkylene may be further substituted with hydroxy, and 15 to 95 mole percent of acrylic acid units or a mixture of acrylic acid and (meth)acrylamide units, wherein said polymer is added to said produced water at a rate greater than 5 parts by weight polymer to 10 parts by weight iron in said produced water.

6. A process for stabilizing iron (hydr)oxides as defined in claim 5 wherein said polymer is added at a rate greater than about 6 parts by weight polymer to 10 parts by weight iron in said produced water.

7. The process of claim 1 wherein R' is hydrogen; $R_1$ is hydrogen; R is alkylene having 1 to 3 carbon atoms and X is sulfonate.

* * * * *